US008890930B2

(12) United States Patent
Gu

(10) Patent No.: US 8,890,930 B2
(45) Date of Patent: Nov. 18, 2014

(54) MULTI-CHANNEL VIDEO COMMUNICATION SYSTEM AND METHOD FOR PROCESSING MULTI-CHANNEL VIDEO COMMUNICATION

(75) Inventor: Chenchen Gu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 447 days.

(21) Appl. No.: 13/318,721

(22) PCT Filed: May 6, 2010

(86) PCT No.: PCT/CN2010/072488
§ 371 (c)(1),
(2), (4) Date: Nov. 3, 2011

(87) PCT Pub. No.: WO2010/130182
PCT Pub. Date: Nov. 18, 2010

(65) Prior Publication Data
US 2012/0050457 A1  Mar. 1, 2012

(30) Foreign Application Priority Data

May 12, 2009 (CN) .......................... 2009 1 0039393

(51) Int. Cl.
H04N 7/14 (2006.01)
H04N 21/258 (2011.01)
(Continued)

(52) U.S. Cl.
CPC . *H04N 21/234327* (2013.01); *H04N 21/25825* (2013.01); *H04N 19/00066* (2013.01);
(Continued)

(58) Field of Classification Search
CPC ............ H04N 7/14–7/148; H04N 7/15–7/157; H04N 7/173–7/17363; H04N 7/20; H04N 19/00066; H04N 19/00206; H04N 19/00236; H04N 19/00369; H04N 19/00424; H04N 19/0043; H04N 19/00436; H04N 19/00442; H04N 19/00448; H04N 19/00454; H04N 19/0046; H04N 19/00472; H04N 21/2343–21/23439; H04N 21/24–21/2408; H04N 21/258–21/25866; H04N 21/2662; H04W 28/0215
USPC .................... 348/14.01–14.16; 370/259–271, 370/351–357; 709/201–207, 217–248
See application file for complete search history.

(56) References Cited

U.S. PATENT DOCUMENTS 6,611,674 B1 * 8/2003 Jokimies et al. ................. 455/69
7,535,484 B2 * 5/2009 Lessing et al. ............. 348/14.01
(Continued)

FOREIGN PATENT DOCUMENTS

CN        1605075 A     4/2005
CN      101043618 A     9/2007
(Continued)

OTHER PUBLICATIONS

International Search Report regarding PCT/CN2010/072488, dated Aug. 12, 2010 (in Chinese with English translation).
(Continued)

*Primary Examiner* — Hemant Patel
(74) *Attorney, Agent, or Firm* — Harness, Dickey & Pierce, P.L.C.

(57) ABSTRACT

The present invention provides a multi-channel video communication system which includes a scalable video codec, a bit-stream truncating module, a network module and a multi-channel bit-stream truncating control module. The scalable video codec encodes a video source to generate a scalable original video bit-stream. The bit-stream truncating module is set between the scalable video codec and the network module, truncates the original video bit-stream to obtain a final video bit-stream and sends the final video bit-stream to the remote client device through the network module. The multi-channel bit-stream truncating control module is connected with the bit-stream truncating module, calculates a filter parameter for each bit-stream truncating unit in the bit-stream truncating module based on received device capabilities and network conditions of the remote client device. The present invention also provides a multi-channel video communication method in the above multi-channel video communication system.

5 Claims, 4 Drawing Sheets

(51) Int. Cl.
*H04N 19/117* (2014.01)
*H04N 21/2343* (2011.01)
*H04N 19/164* (2014.01)
*H04N 19/196* (2014.01)
*H04N 21/24* (2011.01)
*H04N 19/36* (2014.01)
*H04N 19/33* (2014.01)
*H04N 19/156* (2014.01)
*H04N 19/31* (2014.01)

(52) U.S. Cl.
CPC ... *H04N 21/23439* (2013.01); *H04N 19/00236* (2013.01); *H04N 19/00369* (2013.01); *H04N 21/2402* (2013.01); *H04N 19/00448* (2013.01); *H04N 19/00436* (2013.01); *H04N 19/00206* (2013.01); *H04N 19/0043* (2013.01)
USPC .................. 348/14.15; 348/14.12; 348/14.13

(56) References Cited

U.S. PATENT DOCUMENTS

| | | | | |
|---|---|---|---|---|
| 7,593,032 | B2* | 9/2009 | Civanlar et al. | 348/14.09 |
| 7,764,965 | B2* | 7/2010 | Bartlett | 455/436 |
| 8,300,556 | B2* | 10/2012 | Kalipatnapu et al. | 370/260 |
| 2003/0135863 | A1* | 7/2003 | Van Der Schaar | 725/95 |
| 2007/0005690 | A1 | 1/2007 | Corley et al. | |
| 2008/0211901 | A1* | 9/2008 | Civanlar et al. | 348/14.09 |
| 2009/0033739 | A1* | 2/2009 | Sarkar et al. | 348/14.09 |
| 2011/0149145 | A1* | 6/2011 | Ramos et al. | 348/441 |

FOREIGN PATENT DOCUMENTS

| | | |
|---|---|---|
| CN | 101365125 A | 2/2009 |
| CN | 101552913 A | 10/2009 |
| EP | 2051525 A1 | 4/2009 |
| RU | 2377736 C2 | 12/2009 |

OTHER PUBLICATIONS

International Report on Patentablilty (Chapter 1) regarding International Application No. PCT/CN2010/072488, issued Nov. 15, 2011 (in Chinese with English translation).
First Office Action from Russian Federal Service for Intellectual Property (Rospatent) regarding Russian Patent Application No. 2011149387 (with English translation).
First Office Action from the Mexican Institute of Industrial Property (MIIP) regarding Mexican Patent Application No. MX/A/2011/012029, dated Aug. 16, 2012 (with English translation).
Second Office Action from the Mexican Institute of Industrial Property (MIIP) regarding Mexican Patent Application No. MX/A/2011/012029, dated Nov. 16, 2012 (with English translation).
Chinese Office Action for Chinese Patent Application No. 200910039393.6, dated Apr. 13, 2010, and English translation thereof.

* cited by examiner

MULTI-CHANNEL VIDEO COMMUNICATION SYSTEM AND METHOD FOR PROCESSING MULTI-CHANNEL VIDEO COMMUNICATION

CROSS-REFERENCE TO RELATED APPLICATIONS

This application is a U.S. National Stage Application of International Application No. PCT/CN2010/072488, filed May 6, 2010 and published in Chinese as WO/2010/130182 on Nov. 18, 2010. This application claims priority to Chinese Application No. 200910039393.6, filed May 12, 2009. The disclosures of the above applications are incorporated herein by reference.

FIELD OF THE INVENTION

The present invention relates to a video communication system and a method, and more particularly, to a multi-channel video communication system and a method for processing multi-channel video communication.

BACKGROUND OF THE INVENTION

Along with development and popularization of Internet and wireless communications, multi-channel video communications, including multi-person video chats, video conferences and network video games etc., provide more convenient and expedite communications between people, more enriched entertaining activities, and thus become more and more popular.

In multi-channel video communications, since a multi-channel network may be heterogeneous and time-variant, and terminal devices (such as mobile phones and PCs) may have different processing capabilities, it is required a video encoder can generate a bit-stream which can meet different requirements and is adaptive to network conditions fluctuations. In addition, when the number of persons participating in the video communication increases, the amount of network transmission data increases correspondingly, and much processing pressure is also added to terminal devices. Thus it is important to properly assign bandwidths for the multi-channel video communications to achieve optimal video communication quality with limited bandwidth resources.

In conventional video communications, each client device participating in video communication has a video codec. Coding parameters of the codec are configured for video encoding and decoding according to network conditions or terminal processing capability of an average user or most users. Original video data is encoded to generate a single bit-stream with specific decoding video quality, and the single bit-stream is broadcasted to all users participating in the video communication. For the same video source, the videos received by all users are of the same quality. The disadvantages of the conventional technology are obvious, i.e., it can not accommodate the various terminal processing capabilities and different network conditions. For a user with relatively good network conditions (e.g. with relatively large network bandwidth) or with a terminal device having strong processing capability (e.g., can handle pictures with high display resolution which can not be processed by most terminal devices), resources (the network bandwidth or the device processing capability) are not fully used and the video communication quality is not optimal. For a user with relatively bad network conditions (e.g. with relatively small network bandwidth or in a network with heavy traffic) or with a terminal device having poor processing capability (e.g. can only display pictures with low resolution), the video communication may congest the network (which results in long-time buffering of the video) or the terminal device can not perform processing properly (e.g. can not display the video normally).

Regarding the above problems, each client device may set a separate video codec for each connection path connected to the client device, and coding parameters of each video codec are adjusted separately according to the network conditions of each connection path and the processing capability of the terminal device to generate and transmit bit-streams which have different decoding video qualities for different terminals. However, since video encoding has high computation complexity and a dedicated video codec needs to be set up for each terminal newly connected to the client device, when the number of connections in the video communication increases, a big amount of processing resources will be occupied and too much memory resources will be consumed, which makes some hand-held devices can not perform multi-channel communication.

SUMMARY OF THE INVENTION

It is necessary to provide a multi-channel video communication system applicable to different network conditions and terminal devices.

In addition, the present invention also provides a method for processing multi-channel video communication applicable to different network conditions and terminal devices.

A multi-channel video communication system includes:

a scalable video codec, for encoding a video source to generate a scalable original video bit-stream, sending the scalable original video bit-stream to a bit-stream truncating module;

the network module, for obtaining device capabilities and network conditions of a client device, sending the device capabilities and the network conditions to the bit-stream truncating module, sending a final vide bit-stream obtained by the bit-stream truncating module to the remote client device;

the bit-stream truncating module, for sending the device capabilities and the network conditions of the remote client device to a multi-channel bit-stream truncating control module, truncating the original video bit-stream according to a filter parameter sent by the multi-channel bit-stream truncating control module, obtaining the first final video bit-stream and sending the first final video bit-stream to the network module;

the multi-channel bit-stream truncating control module, for calculating the filter parameter of each bit-stream truncating unit in the bit-stream truncating module according to the received device capabilities and the network conditions of the remote client device, and sending the filter parameter to the bit-stream truncating module.

A method for processing multi-channel video communication includes:

encoding a video source to generate a scalable original video bit-stream;

obtaining device capabilities and network conditions of a remote client device;

calculating a filter parameter according to the device capabilities and the network condition;

truncating the original video bit-stream according to the filter parameter, obtaining a final video bit-stream and sending the final video bit-stream to the remote client device.

By using the multi-channel video communication system including the scalable video codec, by using the scalability of the bit-stream, processing capabilities of different terminal devices and different network bandwidth status are adapted to, and thus higher flexible is achieved compared with the mode of broadcasting the single conventional bit-stream; meanwhile, the complexity of the scalable video coding is similar with the conventional video coding, hence the complexity of the multi-channel video communication system including the scalable video codec is greatly reduced compared with the multi-channel video communication system including multiple conventional video codec.

In the examples of the present invention, the priority threshold of each bit-stream truncating unit is calculated according to the processing capability of the terminal and the real time network bandwidth status by using a priority relationship of all bit-stream packets in an image group determined according to a current coding frame distance, hence the bit-stream truncation is performed in real time, and the bit rate for truncating the bit-stream can adapt to the bandwidth request correctly. In addition, in view of the rate distortion characters of the multi-channel bit-stream, the bandwidth are assigned to the videos of multiple paths reasonably, which makes the whole quality of the multi-channel video approach optimization, thereby improving the whole video communication quality of multi-person video communication.

DETAILED DESCRIPTION OF THE INVENTION

Figure 1:
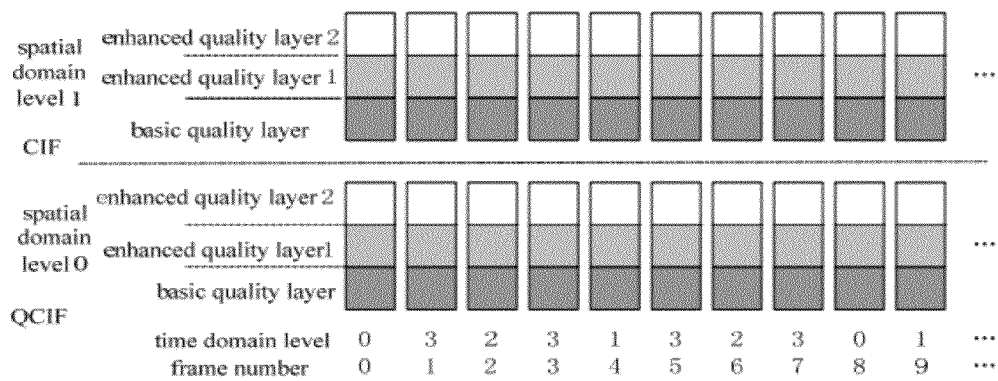
FIG. 1 is a schematic illustrating a structure of a bit-stream according with JVT SVC (Joint Video Team Scalable Video Coding).

Scalable Video Coding is a video coding scheme developed for heterogeneous networks and variety of terminal device, which makes a bit-stream scalable in spatial domain, time domain and quality. In multi-channel video communication, the scalability of the bit-stream makes it possible that a bit-stream most suitable for a remote client device can be obtained according to the device capabilities of the remote client device and the network conditions and transmitted. Therefore, network bandwidth resources and client device processing capability can be utilized reasonably and the overall video communication quality of multi-person video communication is improved.

The JVT SVC (Joint Video Team Advanced Video Coding) defined based on H.264 AVC can provide scalability in each of spatial domain, time domain and quality which will be described respectively.

Regarding the salability in spatial domain, because different display devices have different maximum resolutions of for displaying images, multiple spatial resolutions are provided for each image frame in a video to implement the salability in spatial domain. Each spatial resolution corresponds to a spatial domain level and different spatial domain levels indicate different resolutions, and this is designed mainly for situations where display screens of different receiving devices have different resolutions.

The salability in time domain is implemented by using a hierarchical-B image coding structure. Each image frame is allocated to a time domain level, and motion compensation prediction is performed by using images of lower time domain levels as reference frames for images of higher time domain levels.

Hierarchical-B image coding is a coding scheme completely conforming to the H.264/AVC standard, and adopts a pyramid coding order. According to hierarchical-B image coding, if those images coded before a certain image is coded is displayed prior to the displaying of the certain image, the certain image is referred to as a key frame. When the hierarchical-B image coding is adopted, the first frame of a video sequence is coded as a frame I, and then key frames are coded. A key frame may be coded as a frame I, or coded as a frame P by using a preceding key frame as a reference image. Other images in an image group are coded by B frame coding, but the coding is performed in a pyramid coding order. Taking an image group of 8 frames as an example, the $8^{th}$ frame is coded firstly, then the $4^{th}$ frame, and then the $2^{nd}$ and $6^{th}$ frames. Finally, the $1^{st}$, $3^{rd}$, $5^{th}$, and $7^{th}$ frames are coded. The pyramid coding order realizes the salability in time domain (time classification). All the key frames compose a video sequence which has the biggest granularity in time resolution. And the time resolution increases with the increase of the coding order of the images, and finally a video sequence with complete time resolution is obtained.

Regarding to the salability in quality, the original video is encoded to generate multiple bit-stream quality layers, and the bit-stream quality layers includes a basic quality layer and multiple enhanced quality layers. The bit-stream quality layer for a spatial resolution may be the basic quality layer or one of the multiple quality layers. The basic quality layer includes video signals, and is the most basic and the most important quality layer. After receiving information including the basic quality layer, a receiving end may process the information to obtain an image with basic quality (i.e. an image that meets basic requirements for identification). An enhanced quality layer includes detailed information of the video signals. After receiving the detail information, the receiving end may process the information in the basic quality layer and the enhanced quality layer together to obtain an image with higher quality. The enhanced quality layers are obtained by gradually decreasing the quantification block length, thus the quality of images obtained by decoding the basic quality layer and the enhanced quality layers is increased gradually.

For a given spatial resolution, the JVT SVC packs bit-stream data in one quality layer of each frame into a bit-stream packet. FIG. 1 shows a structure of a bit-stream which includes two spatial domain levels (i.e., spatial domain levels 0 and 1 are respectively corresponding to QCIF (Quarter common intermediate format) (176 pixels*144 pixels) and CIF (352 pixels*288 pixels)), four time domain levels (i.e., time domain levels 0-3 are respectively corresponding to frame rates of 3.75 fps, 7.5 fps, 15 fps, 30 fps), and each spatial domain level includes three quality layers.

Example One

In multi-person video communications, at least three parties in the network perform instant video communication at the same time, and the parties interact with each other through multi-channel video communication system client devices.

Figure 2:
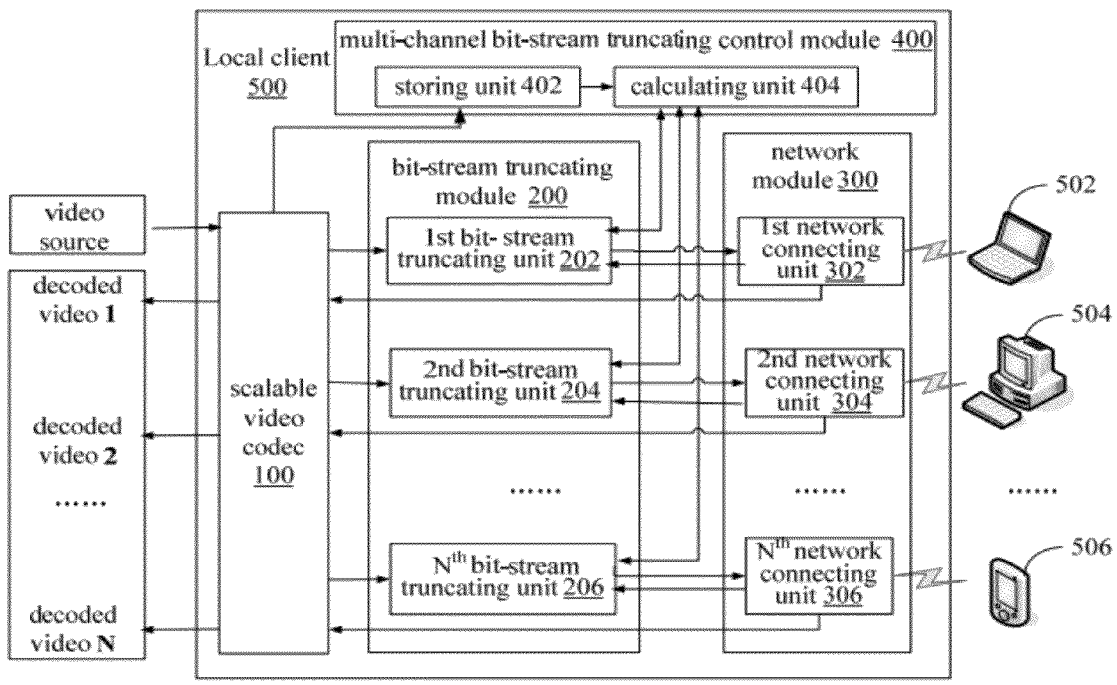
FIG. 2 is a schematic illustrating a structure of a system according to an example.

FIG. 2 shows modules in a multi-channel video communication system. In FIG. 2, a local client device 500 performs video communication with other N (N≥2) remote client devices.

The multi-channel video communication system includes a scalable video codec 100, a bit-stream truncating module 200 which includes N bit-stream truncating units, a network module 300 including N network connecting units which are connected with the N bit-stream truncating units respectively, and a multi-channel bit-stream truncating control module 400 connected with the N bit-stream truncating units.

The scalable video codec 100 is adapted to encode a video source to generate a scalable original bit-stream, send the scalable original bit-stream to the bit-stream truncating module 200, and decode a video bit-stream received by the network module 300 from a remote client device to generate a video.

The network module 300 is adapted to obtain device capabilities and network conditions of the remote client device, send the device capabilities and the network conditions to the bit-stream truncating module 200, send a final vide bit-stream obtained from the bit-stream truncating module 200 to the remote client device, and send the video bit-stream of the remote client device to the scalable video codec 100.

The bit-stream truncating module 200 is adapted to send the device capabilities and the network conditions of the remote client device to the multi-channel bit-stream truncating control module 400, filter the original video bit-stream according to a filter parameter sent by the multi-channel bit-stream truncating control module 400, obtain the final video bit-stream and send the final video bit-stream to the network module 300.

The bit-stream truncating module 200 includes at least two bit-stream truncating units, and the network module 300 includes at least two network connecting units.

The bit-stream truncating units are connected with the network connecting units in a one-to-one correspondence. The network connecting unit is connected with the remote client device. The bit-stream truncating unit filters the original video bit-stream according to the filter parameter provided by the multi-channel bit-stream truncating control module 400 and obtains the final video bit-stream. The network connecting unit obtains and sends the device capabilities and the network conditions of the remote client device to the bit-stream truncating units and sends the received video bit-stream from the remote device to the scalable video codec, or sends the final video bit-stream of the local client device to the remote client device.

The multi-channel bit-stream truncating control module 400 configures the filter parameter for bit-stream truncation according to the received device capabilities and network conditions of the remote client device and sends the filter parameter to the bit-stream truncating module 200.

The multi-channel bit-stream truncating control module 400 includes a storing unit 402 and a calculating unit 404. The storing unit 402 is adapted to store parameter information related to the filtering. The calculating unit 404 is adapted to calculate the filter parameter for the bit-stream truncating module 200 according to the device capabilities, the network conditions and the parameter information.

During video communication, a bit-stream truncating unit and a network connecting unit is established for each remote client device for implementing the communication with the remote client device.

As shown in FIG. 2, according to the direction of data flow of the local client device, the scalable video codec 100 is connected with N bit-stream truncating units, i.e. the first bit-stream truncating unit 202, the second bit-stream truncating unit 204, . . . , the $N^{th}$ bit-stream truncating unit 206. The first bit-stream truncating unit 202 is connected with the first network connecting unit 302, the second bit-stream truncating unit 204 is connected with the second network connecting unit 304, . . . , the $N^{th}$ bit-stream truncating unit 206 is connected with the $N^{th}$ network connecting unit 306. The first network connecting unit 302 is connected with the first client device 502, the second network connecting unit 304 is connected with the second client device 504, . . . , the $N^{th}$ network connecting unit 306 is connected with the $N^{th}$ client device 506.

The N network connecting units of the network module 300 are all connected with the scalable video codec 100.

Figure 3:
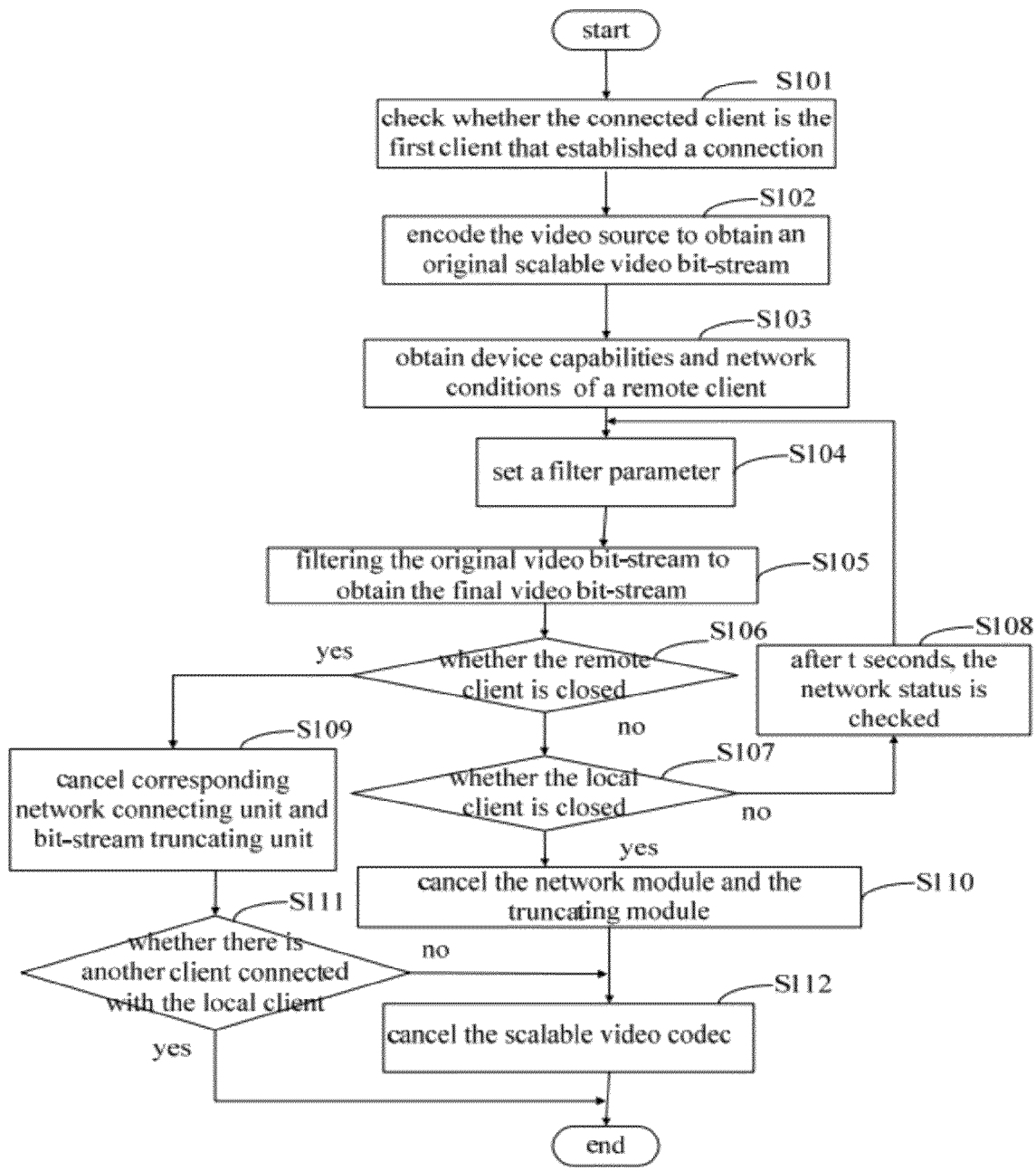
FIG. 3 is a flowchart illustrating a processing procedure of multi-channel video communication.
Figure 4:
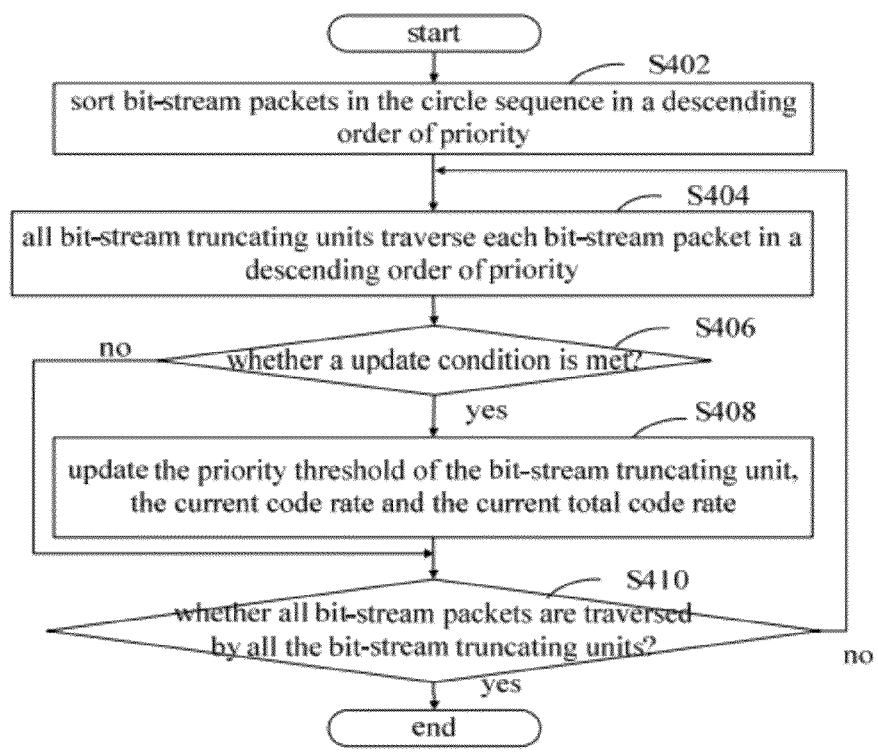
FIG. 4 is a flowchart illustrating a processing procedure of setting a priority threshold.

Taking the process from establishing to disconnecting the communication connection between the local client device 500 and the first remote client device 502 shown in FIG. 2 as an example, the processing procedure of performing multi-channel video communication by using the multi-channel video communication system with the above structure is as shown in FIG. 3, which may include the following procedures.

At block S101, the local client device 500 checks whether the first remote client device 502 to which a connection is newly established is the first client device that establishes a connection with the local client device. Since the multi-channel video communication system of the local client device 500 needs only one scalable video codec 100, if the first remote client device 502 is the first client device that establishes such connection, a scalable video codec 100 needs to be established in the local client device, thus there is no needed to establish another scalable video codec 100 when another client device establishes a connection subsequently but the existing scalable video codec is used. For this reason, it is checked whether each client device establishing the connection is the first client device that establishes a connection with the local client device.

At block S102, the video source is encoded to obtain a scalable original video bit-stream. The scalable video codec 100 encodes the video source according to JVT SVC to obtain the scalable original video bit-stream, i.e. a bit-stream with bit-stream packets for different time domain levels, spatial domain levels and quality levels. Each bit-stream packet includes an identity which indicates information of the bit-stream packet. The identities, i.e. the information of the bit-stream packets, are transmitted to and stored in the storing unit 402 of the multi-channel bit-stream truncating controlling module 400.

At block S103, the device capabilities and the network conditions of the client device are obtained. It is the first network connecting unit 302 that obtains the device capabilities and the network conditions. The network conditions may include the maximum usable uplink bandwidth of the local client device 500 and the maximum usable downlink bandwidth of the first remote client device 502. The device capabilities may include the maximum display resolution and the maximum frame rate of the first remote client device 502. All the above mentioned information is transmitted to the first bit-streaming truncating unit 202.

At block S104, the filter parameter is configured according to the device capabilities and the network conditions. Specifically, the filter parameter of the first bit-stream truncating unit 202 is adjusted according to the device capabilities and the network conditions of the client device 502 connected with the first bit-stream truncating unit 202. Bit-stream packets not meeting the condition set by the filter parameter will not pass through the first bit-stream truncating unit 202. Detailed procedure for filtering the packets will be described in block S402-S410.

At block S105, a final video bit-stream is obtained by filtering the original video bit-stream according to the filter parameter, and is sent to the remote client device. After the filter parameter is determined, the first bit-stream truncating unit 202 truncates the original video bit-stream, obtains the final video bit-stream and sends the final video bit-stream to the first remote client device 502 through the first network connecting unit 302.

At block S106, it is checked whether the remote client device is closed. After the first remote client device 502 is closed, the first bit-stream truncating unit 202 and the first network connecting unit 302 allocated for the first remote client device 502 are no longer needed, thus are canceled to release the occupied resources. In response to a determination that the first remote client device 502 is closed, block S109 is performed; in response to a determination that the first remote client device 502 is not closed, block S107 is performed.

At block S107, it is checked whether the local client device 500 is closed. When there is no demand for video communication, the local client device 500 is then closed, and resources occupied by all involved modules are also released. In response to a determination that the local client device 500 is closed, block S110 is performed; in response to a determination that the local client device 500 is still working, block S108 is performed.

Blocks S107 and S106 may be performed in parallel or one after the other.

At block S108, after a period of time, the network conditions are checked. Because the network conditions are not fixed, the filter parameter needs to be changed when the network conditions changes, so there is the need to check the network conditions of the first remote client device 502 at intervals to get the network conditions in time.

At block S109, corresponding network connecting unit and bit-stream truncating unit are canceled. When the first remote client device 502 ends the video communication, the first network connecting unit 302 and the first bit-stream truncating unit 202 are canceled.

At block S110, the network module and the bit-stream truncating unit module are canceled. When the local client device 500 is closed, the video communication connections with all remote client devices are disconnected, therefore all the bit-stream truncating modules 200 and the network modules 300 involved in the video communication are no longer needed and thus are canceled to release the occupied system resources, and then block S112 is performed.

At block S111, it is checked whether there is any client device being connected with the local client device 500. When it is monitored that the first remote client device 502 is closed, it is checked whether the first remote client device 502 is the last client device. In response to a determination that all connected remote client devices are closed, block S112 is performed; otherwise, the processing procedure for the communication between the local client device 500 and the first remote client device 502 are ended.

At block S112, the scalable video codec 100 is canceled and the video communication processing is ended.

In block S104, the key to obtaining the adaptive bit-stream lies in the real time bit-stream truncation, i.e. configuring the filter parameter in real time, and thus the embodiments of the present invention provide a method of calculating a priority threshold for each bit-stream truncating unit according to priorities of all bit-stream packets that have a distance within the size of an image group from the current coding frame. After obtaining the priority threshold by using the above method, bit-stream packets with a priority higher than the priority threshold passes through the bit-stream truncating unit and is then transmitted, and bit-stream packets with a priority lower than the priority threshold can not pass through the bit-stream truncating unit. Herein, the image group consists of all the frames between a key frame and a preceding key frame before the key frame.

The storing unit 402 of the multi-channel bit-stream truncating module 400 stores a cyclic queue of information of all bit-stream packets in the latest image group. The information of each bit-stream packet include a priority $p_k$, a time domain level $t_k$, a spatial domain level $s_k$ and a bit rate increment $R_k$. $R_k = l_k \times Fps_{max}/GopSize$ of a bit-stream packet k. $R_k$ indicates the increment of network resources for transmitting the bit-stream packet, $l_k$ represents the length of the bit-stream packet k, $Fps_{max}$ represents a frame rate corresponding to the maximum time domain level, GopSize represents the number of images included in one image group.

Assume that in the scalable video codec 100 of the local terminal 500, the number of spatial domain levels is S, the number of time domain levels is T. $s_i$ represents a spatial domain level corresponding to the maximum display resolution of the $i^{th}$ client device connected with the local client device, and $f_i$ represents a time domain level corresponding to the maximum frame rate of the $i^{th}$ client device connected with the local client device. $B_{up0}$ represents the maximum available uplink bandwidth of the local client device, and $B_{0i}$ represents the maximum available downlink bandwidth of the local client device for the client device i. In the procedure of calculating the priority threshold, the multi-channel bit-stream truncating control module 400 may also store the bit rate of each path of the currently truncated bit-streams, i.e. the current bit rate $R_i$, the sum of the bit rates of all bit-streams currently truncated, i.e. the total bit rate $R_{sum}$, and the current priority threshold of each bit-stream truncating unit i.

In block S104, the filter parameter refers to the priority threshold used for performing filtering according to the priorities of the bit-stream packets in the video bit-stream. Detailed processing of configuring the priority threshold in the calculating unit 404 is as shown in FIG. 3. As shown in FIG. 3, the process may include the following procedures.

At block S402, information of bit-stream packets stored in a cyclic queue in the storing unit 402 is sorted in a descending order of the priority, and the bit-stream packet are assigned index numbers, Index=0, 1, 2, . . . n (n is the number of the bit-stream packets in the cyclic queue).

At block S404, each bit-stream packet is traversed by all bit-stream truncating units in a descending order of the priority, i.e., in an ascending order of the index.

At block S406, it is checked whether an update condition of the priority threshold is met. The update condition is, $$s(Index) \leq s_i, f(Index) \leq f_i, R_i + R(Index) \leq B_{0i}, R_{sum} + R(Index) \leq B_{up0}$$

where, s(Index), f(Index), R(Index) respectively represent the spatial domain level, the frame rate and the bit rate increment of a bit-stream packet with the index number of Index. The above update condition represents that transmission of an image in the quality layer of the current bit-stream packet does not exceed the device capabilities of the connected client device i, the uplink transmitting bit rate does not exceed the uplink bandwidth of the local client device, the downlink transmitting bit rate does not exceed the maximum available downlink bandwidth to the connected client device i, which means that the priority threshold may be reduced to transmit bit-stream packets of higher quality and lower priority. If the update condition is met, processing in block S408 is performed; otherwise, processing in block S410 is performed.

At block S408, the priority threshold of the bit-stream truncating unit, the current bit rate and the current total bit rate are updated, i.e., $$\text{Threshold}_i = P(\text{Index})$$

$$R_i = R_i + R(\text{Index})$$

$$R_{sum} = R_{sum} + R(\text{Index})$$

The priority threshold is set to be the value of the priority of bit-stream packets currently meeting the update condition; the new current bit rate is set to be the sum of the current bit rate and the bit rate increment, and the new current total bit rate is set to be the sum of the current total bit rate and the bit rate increment.

At block S410, it is checked whether all the bit-stream packets have been traversed by all the bit-stream truncating units. If all the bit-stream packets have been traversed by all the bit-stream truncating units, the comparing processing is ended; otherwise, processing in block S404 is performed to process another bit-stream packet.

Because the video sequences within a short time interval have similarity in contents, and the priorities of all bit-stream packets within an image group in the hierarchical-B image coding structure can approximately reflect the priority relationship of bit-stream packets in the whole video sequence. Therefore, calculating the priority threshold of each bit-stream truncating unit based on priorities of all bit-stream packets that having a distance within the size of an image group to the current coding frame not only ensures the bit-stream is obtained in real time, but also ensures the bit rate of the truncated bit-stream can meet the bandwidth requirement precisely and provide approximately optimal video quality.

Example Two

Figure 5:
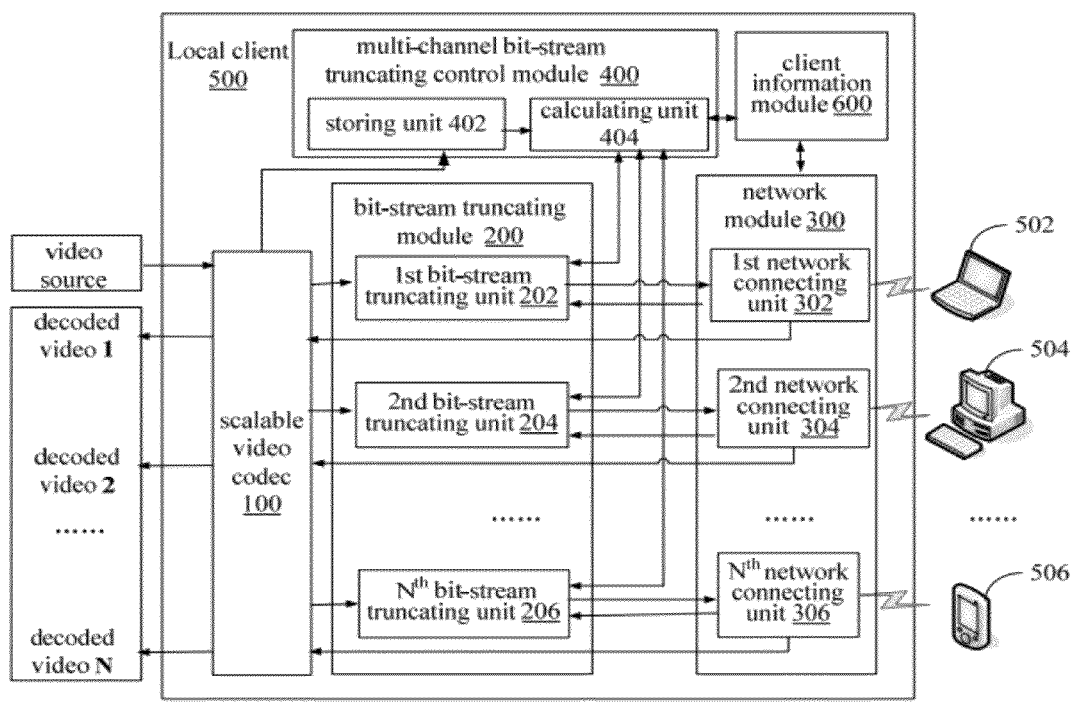
FIG. 5 is a schematic illustrating a structure of a system according to another example.

1. In this example, besides the modules described in example one, a multi-channel video communication system may also include a client device information module 600, as shown in FIG. 5. The client device information module 600 includes a client device information table. The client device information module 600 may obtain communication information of a remote client device through the network control module 300, and send the communication information to the multi-channel bit-stream truncating control module 400.

The items in the client device information table include information related to the video communication, such as an IP address or network physical address, the maximum resolution, the maximum frame rate and the maximum uplink bandwidth etc. of a client device.

After the above information is added into the client device information table, device capabilities of the remote client device may be obtained through different ways. When a remote client device is newly connected with a local client device, the client device information table is sent to the remote client device. When no connection is established, the client device information table of the local client device only includes information of the terminal device of the local client device. After a connection is established, the received client device information table and the local client device information table are combined to obtain a new client device information table. Hence, video communication related information of each client device may be obtained by querying the client device information table before the bit-stream is transmitted.

The processing procedure of the multi-channel video communication in example two is the same with that in example one, and will not be described further herein.

The above embodiments only present some implementing mode of the present invention, and are described in detail, but are not for use in limiting the protection scope of the present invention. For those skilled in the art, any modification, equivalent replacement and improvement made within the scope of the present invention should be covered under the protection scope of the present invention. Hence, the protection scope of the present invention is limited as claimed in claimed.

The invention claimed is:

1. A method for processing multi-channel video communication, comprising:
  encoding a video source to generate a scalable original video bit-stream;
  obtaining device capabilities and network conditions of a remote client device;
  calculating a filter parameter according to the device capabilities and the network condition;
  truncating the original video bit-stream according to the filter parameter, obtaining a final video bit-stream and sending the final video bit-stream to the remote client device;
  wherein the filter parameter comprises: a priority threshold used in truncating the bit-stream according to priorities of bit-stream packets in the video bit-stream; the priority threshold is calculated by applying a selecting method to parameter information stored in a storing unit according to the device capabilities and the network conditions of the remote client device; the parameter information is a cyclic queue of information of all bit-stream packets in an image group; the image group includes a first key frame and frames between the first key frame and a second key frame in the scalable original video bit-stream; the second key frame is a key frame immediately preceding the first key frame in a basic quality layer of the scalable original video bit-stream.

2. The multi-channel video communication method of claim 1, wherein the information of the bit-stream packet comprises a priority, a time domain level, a spatial domain level and a bit rate increment; the method further comprises: when encoding each image frame, adding information of all bit-stream packets corresponding to the image into the cyclic queue.

3. A method for processing multi-channel video communication, comprising:
  encoding a video source to generate a scalable original video bit-stream;
  obtaining device capabilities and network conditions of a remote client device;
  calculating a filter parameter according to the device capabilities and the network condition;
  truncating the original video bit-stream according to the filter parameter, obtaining a final video bit-stream and sending the final video bit-stream to the remote client device;
  wherein the filter parameter comprises: a priority threshold used in truncating the bit-stream according to priorities of bit-stream packets in the video bit-stream; the priority threshold is calculated according to the device capabilities and the network conditions of the remote client device and parameter information stored in a storing unit; the parameter information is a cyclic queue of information of all bit-stream packets in the latest image group;
  wherein calculating the filter parameter includes:
  sorting information of the bit-stream packets in the cyclic queue in a descending order of priority, allocating index numbers to the information of the bit-stream packets with smaller index numbers allocated to information of bit-stream packets of higher priority;

traversing, by each bit-stream truncating unit, all bit-stream packets in an ascending order of the index number; determining whether an update condition is met based on processing capabilities and network bandwidth of all connected client devices; updating the priority threshold in response to a determination that the update condition is met; or not updating the priority threshold in response to a determination that the update condition is not met; checking whether all the bit-stream packets are processed after all the bit-stream truncating units have traversed the current bit-stream packet;

ending the processing in response to a determination that all the bit-stream packets are processed; or processing another bit-stream packet in response to a determination that all the bit-stream packets are not processed.

4. The multi-channel video communication method of claim 3, wherein the update condition comprises:

a spatial domain level of a current bit-stream packet is not larger than a spatial domain level corresponding to the maximum display resolution of a client device of the connected client devices;

a time domain level of the current bit-stream packet is not larger than a time domain level corresponding to the maximum frame rate of the client device;

a bit rate of transmission to the client device, which is the sum of a current bit rate and a bit rate increment, is not larger than the maximum available downlink bandwidth of the client device;

a current total output bit rate, which is the sum of a current total bit rate and the bit rate increment, is not larger than the maximum available uplink bandwidth of a local client device;

when the above conditions are met at the same time, setting the priority threshold to be the value of the priority of the current bit-stream packet, updating the current bit rate to be the sum of the current bit rate and the bit rate increment, and updating the current total bit rate to be the sum of the current total bit rate and the bit rate increment.

5. A method for processing multi-channel video communication, comprising:

encoding a video source to generate a scalable original video bit-stream;

obtaining device capabilities and network conditions of a remote client device;

calculating a filter parameter according to the device capabilities and the network condition;

truncating the original video bit-stream according to the filter parameter, obtaining a final video bit-stream and sending the final video bit-stream to the remote client device;

wherein the filter parameter comprises: a priority threshold used in truncating the bit-stream according to priorities of bit-stream packets in the video bit-stream; the priority threshold is calculated according to the device capabilities and the network conditions of the remote client device and parameter information stored in a storing unit; the parameter information is a cyclic queue of information of all bit-stream packets in the latest image group;

wherein the information of the bit-stream packet comprises a priority, a time domain level, a spatial domain level and a bit rate increment; the method further comprises: when encoding each image frame, adding information of all bit-stream packets corresponding to the image into the cyclic queue;

wherein the bit rate increment is $R_k = l_k \times Fps_{max}/GopSize$, $l_k$ represents the length of a bit-stream packet k, $Fps_{max}$ represents a frame rate corresponding to the maximum time domain level, GopSize represents the number of images included in one image group.

* * * * *